US012616194B2

(12) United States Patent
Moreo Calvo et al.

(10) Patent No.: US 12,616,194 B2
(45) Date of Patent: May 5, 2026

(54) NORMOTHERMIC PERFUSION DEVICE SUITABLE FOR MAINTAINING A LIVER OR A KIDNEY IN OPTIMAL PHYSIOLOGICAL CONDITIONS

(71) Applicant: EBERS MEDICAL TECHNOLOGY, S.L., Saragossa (ES)

(72) Inventors: Pedro Moreo Calvo, Saragossa (ES); Victor Alastrué Vera, Saragossa (ES); Fernando Usón Julián, Saragossa (ES); Javier Conte Blasco, Saragossa (ES); Marta Mainar López, Saragossa (ES)

(73) Assignee: EBERS MEDICAL TECHNOLOGY, S.L., Saragossa (ES)

( * ) Notice: Subject to any disclaimer, the term of this patent is extended or adjusted under 35 U.S.C. 154(b) by 797 days.

(21) Appl. No.: 17/920,664

(22) PCT Filed: Apr. 26, 2021

(86) PCT No.: PCT/ES2021/070278

§ 371 (c)(1),
(2) Date: Oct. 21, 2022

(87) PCT Pub. No.: WO2021/214371

PCT Pub. Date: Oct. 28, 2021

(65) Prior Publication Data

US 2023/0141516 A1     May 11, 2023

(30) Foreign Application Priority Data

Apr. 24, 2020    (ES) ................................ P202030343

(51) Int. Cl.
A01N 1/143          (2025.01)
(52) U.S. Cl.
CPC .................................... *A01N 1/143* (2025.01)

(58) Field of Classification Search
None
See application file for complete search history.

(56) References Cited

U.S. PATENT DOCUMENTS

| | | | |
|---|---|---|---|
| 7,749,693 B2 * | 7/2010 | Brassil | ..................... A01N 1/10 435/1.2 |
| 2014/0377849 A1 * | 12/2014 | Kay | ........................ A01N 1/143 83/13 |
| 2015/0342177 A1 * | 12/2015 | Hassanein | .............. C12M 21/08 435/284.1 |

FOREIGN PATENT DOCUMENTS

| | | |
|---|---|---|
| EP | 3243384 A1 | 11/2017 |
| ES | 2314627 T3 | 3/2009 |

(Continued)

OTHER PUBLICATIONS

"Ark Kidney US", Ebers Medical Technology SL, 2020, Retrieved from the Internet: URL:https://www.youtube.com/watch?v=IrUvyEslYsk , pp. 1-6, 6 pages.

(Continued)

*Primary Examiner* — William H. Beisner
(74) *Attorney, Agent, or Firm* — Hayes Soloway PC

(57) ABSTRACT

The present invention relates to a normothermic perfusion device to maintain optimal physiological conditions for both a liver and a kidney intended to be transplanted, comprising a permanent part and a disposable part, wherein the disposable part comprises a container adapted to house a liver or a kidney and a hydraulic circuit comprising at least one first tube that channels a perfusion fluid externally pumped to the container to the liver or kidney, a second tube that channels a vasodilator fluid to the liver or kidney, and wherein the permanent part comprises in an upper portion a relief configured to house, at least, two containers of different dimensions and geometric configurations.

11 Claims, 3 Drawing Sheets

(56)        References Cited

FOREIGN PATENT DOCUMENTS

| ES | 2685328 T3 | 10/2018 | |
| WO | 0226034 A2 | 4/2002 | |
| WO | 2014001592 A1 | 1/2014 | |
| WO | 2016090498 A1 | 6/2016 | |
| WO | WO-2018130732 A1 * | 7/2018 | ............. A01N 1/143 |

OTHER PUBLICATIONS

"LifePort Kidney Transporter—Operator's Manual", Organ Recovery systems, Inc., 2003, Retrieved from the Internet: URL:http://web.archive.org/web/20070721022154/http://www.organ-recovery.com/pdfs/Kidney -Transporter/LifePort - Operators -Manual.pdf, pp. 1-47, 51 pages.

Gutierrez-Dalmau Alex et al., "Assesing the Effect of Vasodilator in an Ex-Vivo Normothermic Kidney Perfusion Porcine Model" , Transplant International: Abstracts of the 19th Congress of the European Society for Organ Transplantation, 2019, vol. 32, p. 301, 1 page.

"The NormoPerf Project: Updates", 2021, Retrieved from the Internet: URL:http://normoperf.eu/index.php/dissemination/updates?start-5 <accessed on Mar. 21, 2023>.

* cited by examiner

NORMOTHERMIC PERFUSION DEVICE SUITABLE FOR MAINTAINING A LIVER OR A KIDNEY IN OPTIMAL PHYSIOLOGICAL CONDITIONS

CROSS-REFERENCE TO RELATED APPLICATIONS AND PRIORITY

This patent application claims priority from PCT Application No. PCT/ES2021/070278 filed Apr. 26, 2021, which claims priority from Spanish Patent Application No. P202030343 filed Apr. 24, 2020. Each of these patent applications are herein incorporated by reference in their entirety.

OBJECT OF THE INVENTION

The present invention relates to a normothermic perfusion device to maintain in optimal physiological conditions a liver or a kidney intended to be transplanted. More particularly, the present invention describes a device comprising a permanent part and a disposable part, wherein the disposable part comprises a container adapted to house a liver or a kidney, and said container in turn comprises a hydraulic circuit to channel a perfusion medium and a vasodilator to the liver or kidney, and the permanent part comprises pumps, heating elements, a controller configured to regulate the conditions of the fluids in the hydraulic circuit, and further comprises in an upper portion a relief adapted to house and fit the disposable part, so that the same device can perform normothermic perfusion of both a liver and a kidney.

BACKGROUND OF THE INVENTION

Normothermic perfusion devices of a liver or for the kidney are known in the state of the art.

However, the devices known in the state of the art are not compatible with the perfusion of the liver and kidney and, consequently, it is necessary to use two different machines to perfuse each one of the organs.

Likewise, known devices cause splashes in the perfusion process, in addition to a significant risk of contamination during liver or kidney washing, since it is necessary to open the lid of the container to proceed with washing once the perfusion process is completed.

Furthermore, in the known state of the art, the hydraulic circuit can contain air bubbles that can enter the organ, which entails a serious drawback for the perfusion of said organ.

For example, document WO2016/090498A1 discloses a normothermic perfusion device for a liver or a kidney intended to be transplanted comprising a permanent part, a container, a hydraulic circuit comprising a first tube that channels a perfusion fluid externally pumped to the container and a cannula that channels urine or bile outward from the liver or kidney respectively, to an external reservoir.

DESCRIPTION OF THE INVENTION

The present invention seeks to solve some of the problems mentioned in the state of the art. More specifically, the present invention describes a normothermic perfusion device to maintain in optimal physiological conditions a liver or a kidney intended to be transplanted, wherein said device comprises a permanent part and a disposable part, wherein:

the permanent part comprises:
 pumps, heating elements and a control system, configured to regulate fluids in a hydraulic circuit and the temperature of said fluids, whether the container houses a liver or a kidney; and
the disposable part comprises:
 a container that in turn comprises:
  a hydraulic circuit comprising a first tube that channels a perfusion fluid externally pumped to the container to the liver or kidney housed in a central portion inside the container,
  a cannula that channels urine or bile outward from the liver or kidney, respectively, to an external reservoir through a first outlet opening in the container,
wherein the central portion comprises a lower section having a height difference with respect to an upper section and the liver or kidney is arranged between said upper section and the lower section, so that the perfusion fluid after circulating through the liver or the kidney falls into the lower section, said lower section thus acting as a reservoir for perfusion fluid.

Preferably, the permanent part comprises a relief configured to house, at least, two containers of different dimensions and geometric configurations.

The aforementioned device is compatible with both a liver and a kidney, since the disposable part varies the dimensions thereof to house any of these organs, both being configured to fit into the relief of the permanent part.

Likewise, the permanent part can be reused after each perfusion, and it is configured to control the flow and temperature conditions of the hydraulic circuit, so that the organ inside the disposable part is maintained in a state similar to the physiological state throughout the entire process, said physiological states being different for each organ.

Consequently, the same device can be used for both organs (liver or kidney) and there is no need to have two separate machines to perfuse each organ.

In a preferred embodiment, the lower section is equipped with a base with a smaller surface than the base of the upper section, thus preventing the perfusion fluid in contact with the air from deteriorating due to contact with the same.

Since the horizontal section of the base of the lower section is the contact area between the perfusion fluid stored in the lower section and the air, to prevent the perfusion fluid from deteriorating due to contact with the air, the surface in contact with the air should be as small as possible, which is achieved thanks to the geometry of the container, particularly of the lower section which preferably has an area smaller than the upper section of the container.

Preferably, the container comprises a removable tray adapted to fit into the central portion, wherein said removable tray comprises a lower area intended to house the liver or kidney and is equipped with a plurality of openings through which the perfusion liquid falls into the lower section that acts as a reservoir.

Once the removable tray is arranged in the central portion, the liver or kidney would be arranged between the upper section and the lower section, leaving some play or space in the lower section for the perfusion liquid to fall and enable it to act as a reservoir of the same.

Preferably, the inner central portion has a concave configuration.

Note that a distinguishing aspect of the perfusion device is that the outlet vein of the organ is not cannulated, so that, after circulating through the organ, the perfusion fluid falls into the container and is collected in the lower section. Therefore, this lower section acts as a reservoir for the circuit, avoiding having to include an ad hoc reservoir in the circuit as with some known devices.

Preferably, the renal container comprises a second outlet opening in the container located on the opposite side with respect to the first outlet opening, making it easier to position the ureteral cannula towards any of the openings-first or second opening-thus enabling both right and left kidneys to be housed in a natural position.

Furthermore, the second tube is connected to the inlet of the artery of the organ by means of a connector, thus enabling the vasodilator to be introduced very close to the renal artery or hepatic artery.

Preferably, the perfusion device comprises a connection tube operatively connected to the inlet of the artery of the liver or kidney, said connection tube fluidly communicated to the first tube and to the second tube, thus enabling the vasodilator fluid to be substantially introduced into the inlet of the artery of the liver or kidney.

Note that various substances are delivered to the organ during perfusion. One of the most important ones is a vasodilator that serves to ensure that the organ is adequately perfused. Consequently, in a preferred embodiment, the inlet of the vasodilator is made very close to the renal artery or hepatic artery in order to decrease the time it takes for the vasodilator to reach the organ, which is especially important in damaged organs with very low perfusion flow rates.

The delivery of the vasodilator fluid directly to the inlet of the organ (in other words, inside the container, just before where the artery begins) is a critical and distinguishing factor of the perfusion device.

When an organ is connected to the device, especially if it has been previously cold-preserved, the entire vascular tree thereof is very closed and offers high resistance to flow. By offering so much resistance, the flow rate that can be circulated through it is very low, with the consequent problem of delivering enough oxygen and nutrients.

To solve this problem, a vasodilator is delivered directly into the inlet of the organ. If the delivery occurs right at the inlet of the artery, it is guaranteed to have an immediate and faster effect than if the vasodilator is added at another point in the circuit.

This requires a tube to be passed into the container specifically for the vasodilator, specifically the aforementioned second tube, which is connected to the hydraulic circuit just before the organ.

Note that the delivery conditions of the perfusion fluid are totally different from those of the vasodilator (precision of the pumping system, flow rates and delivery pressure, tube diameters, etc.); therefore, it is especially advantageous to equip the device with a specific tube or second tube that fluidly connects a vasodilator fluid with the hydraulic circuit right at the inlet of the artery of the organ to be perfused.

The hydraulic circuit may have, at least, one stopcock to purge said hydraulic circuit before starting a perfusion, so that the inlet of air into the organ is prevented, which would be a serious drawback for the perfusion of the organ.

Preferably, the hydraulic circuit has two stopcocks, one for the first tube that channels the perfusion fluid and a separate one for the second tube that channels the vasodilator fluid.

In a preferred embodiment, the container in the central portion comprises at least one ramp located between the lower section and the upper section, wherein said ramp comprises holders to hold the first tube and/or the second tube before the liver or kidney are housed.

Note that the device starts pumping the perfusion flow before introducing the liver or kidney; therefore, to avoid splashing, the device may comprise the holders in the ramp, providing a hold that maintains the first tube and/or the second tube oriented towards the lower portion until the organ is introduced into the container, thus preventing splashing and foaming in the container. Consequently, the perfusion process is cleaner.

Specifically, in a preferred embodiment, the container in the central portion comprises at least one ramp located between the lower section and the upper section, wherein said ramp comprises holders to hold the first tube that channels the perfusion fluid, wherein the ramp and the holders are adapted to guide said first tube to the lower section until desired operating conditions are reached prior to connection of the liver or kidney.

Preferably, the container comprises a second ramp which, together with holders intended for this purpose, guides the second tube to channel the vasodilator fluid to the lower section of the container.

In a preferred embodiment, the hydraulic circuit comprises a valve located externally to the container and operatively communicated with the second tube and with an external washing tube that channels a washing fluid, so that the valve is adapted to stop the inlet of vasodilator fluid and enable the inlet of the washing flow, thus enabling the liver or kidney to be washed without the need to remove it from the container.

A second aspect of the present invention describes a method for perfusing a liver or a kidney that makes use of the perfusion device described above, comprising the following steps:

placing the liver or kidney in the central portion of the container, the liver or kidney being arranged between the lower section and the upper section of said central portion; and fluidly connecting the perfusion fluid to the vascular inlets of the liver or kidney, in such a way that after circulating through the liver or kidney the perfusion fluid leaves the same and falls into the lower section of the container wherein it is stored, said lower section acting as a reservoir.

Preferably, the method further comprises a preliminary conditioning step which in turn comprises:

making use of the holders and the ramp to guide the first tube that channels the perfusion fluid to the lower section of the container prior to connecting the liver or kidney until favourable operating conditions are reached.

The preliminary conditioning or "preconditioning" step comprises filling the circuit with perfusion liquid and bringing it to favourable conditions which comprise, at least, the appropriate temperature. This process can take several minutes (up to 20 minutes). Only when the perfusion fluid has reached the target temperature can the organ be connected to the machine. Favourable conditions can refer not only to temperature, but also to other operating conditions that may be necessary to reach until the liver or kidney is connected.

As a result, the ramps make it possible to dispense with what is known in the state of the art as "surrogate organ" during this preliminary conditioning phase. This technique that uses the "surrogate organ" consists of a small circuit (a tube or set of tubes) that replaces the organ by conveying the perfusion fluid during preconditioning.

The present invention avoids the use of this "surrogate organ" by allowing the perfusion liquid to leak out and accumulate in the lower section. If there were no guide ramps, the perfusion liquid would splash and stain all the container walls during preconditioning, which is undesirable, so a "surrogate organ" would have to be used, making it more laborious and complex.

In a preferred embodiment, the method comprises a washing step comprising stopping the inlet of the vasodilator fluid by making use of the washing valve of the second tube, and introducing a colder washing fluid into said second tube, thus enabling the organ to be washed and damage to be prevented in the event of unexpected failure without the need to remove it from the container.

The aforementioned washing step is always carried out at the end of perfusion, before transplanting the organ. In addition, it can also be carried out in an emergency if the machine starts having problems.

In either case, it is essential to be able to carry out this method inside the container, without removing the organ from the machine, for at least two reasons:

(i) it enables washing to be carried out while maintaining sterility; and (ii) it enables the washing to be done very quickly, without wasting time extracting the organ from the machine.

In addition, note that by using the same hydraulic circuit via the use of the washing valve, in other words, through the same tube that leads the vasodilator inside the container, the washing fluid is delivered right at the inlet of the organ, thus enabling it to not be diluted and, furthermore, to quickly enter the liver or kidney at a low temperature and with the desired flow rate. Additionally being able to control the inlet conditions of washing flow more precisely by not being diluted with other fluids in the hydraulic circuit before entering the organ.

In normothermia, if any problem arises during perfusion (leaks in the circuit, failure of the machine, etc.), the organ deteriorates rapidly without an adequate delivery of nutrients and oxygen as it is at 37° C. The way to prevent damage to the organ according to the present invention comprises stopping the perfusion device and washing the organ with a cold perfusion solution at approximately 4° C.

Note that by the term "wash", the present invention refers to perfusing this cold solution through the vascular tree of the organ. This has to be done quickly, and preferably while the organ is maintained inside the container to maintain sterile conditions.

Furthermore, the described device and method enable it to be carried out without needing to use any additional pumping system or element, since those belonging to the device may not be available and the user may not have an external system available. The configuration of the perfusion device enables this washing step to be carried out in a very simple way, providing inclusion of the aforementioned washing valve arranged at the inlet of the container.

DESCRIPTION OF THE DRAWINGS

As a complement to the description provided and for the purpose of helping to make the features of the invention more readily understandable, in accordance with a practical preferred exemplary embodiment thereof, said description is accompanied by a set of drawings which, by way of illustration and not limitation, represent the following.

PREFERRED EMBODIMENT OF THE INVENTION

Figure 1:
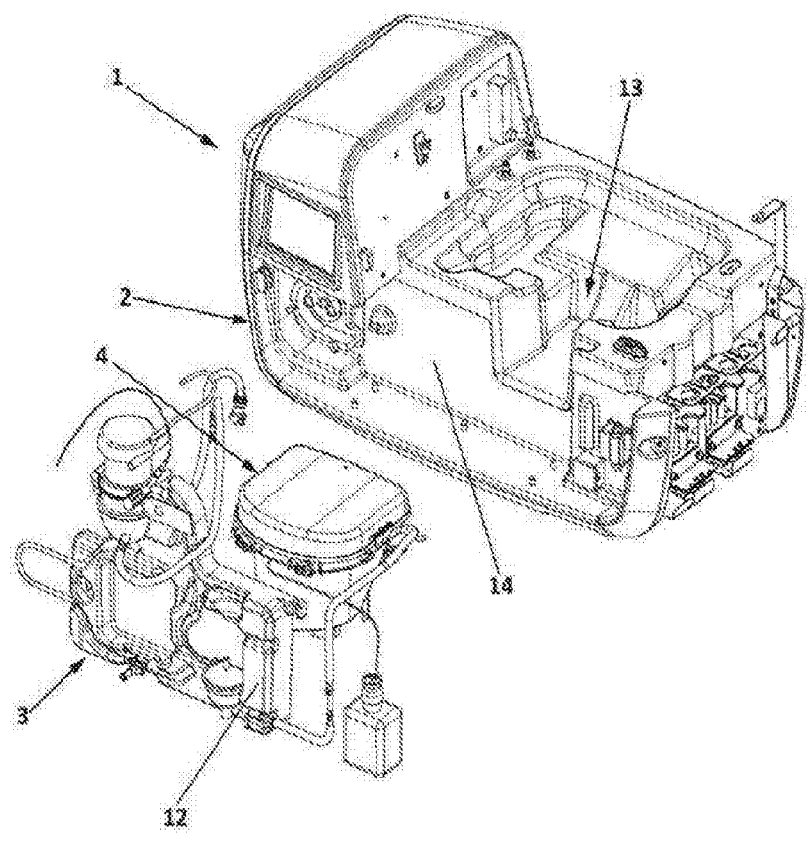
FIG. 1 shows an exploded perspective view of a preferred embodiment, wherein the disposable part and the permanent part are shown separated.

FIG. 1 shows an exploded perspective view of the device wherein a normothermic perfusion device (1) to maintain in optimal physiological conditions a kidney or a liver intended to be transplanted is clearly seen, wherein said device (1) comprises a permanent part (2) and a disposable part (3).

As shown in FIG. 1, the disposable part (3) comprises a container (4) attached to a panel (12).

In the preferred embodiment of FIG. 1, in an upper portion, the permanent part (2) is equipped with a relief (13) configured to house two containers (4) of different dimensions and geometric configurations, in this case a container (4) intended to house a kidney being illustrated, wherein a liver or kidney would be housed, respectively.

Likewise, the permanent part (2) comprises, at least, flow pumps, heating elements and a control system configured to regulate flows in a hydraulic circuit (17) as well as temperature conditions, whether it is a liver or a kidney housed inside the container (4); in this preferred embodiment, said container (4) is thus adapted for a kidney.

In a preferred embodiment, said container (4) is equipped with a lid designed to protect the organ from external environmental conditions.

Figures 2, 3:
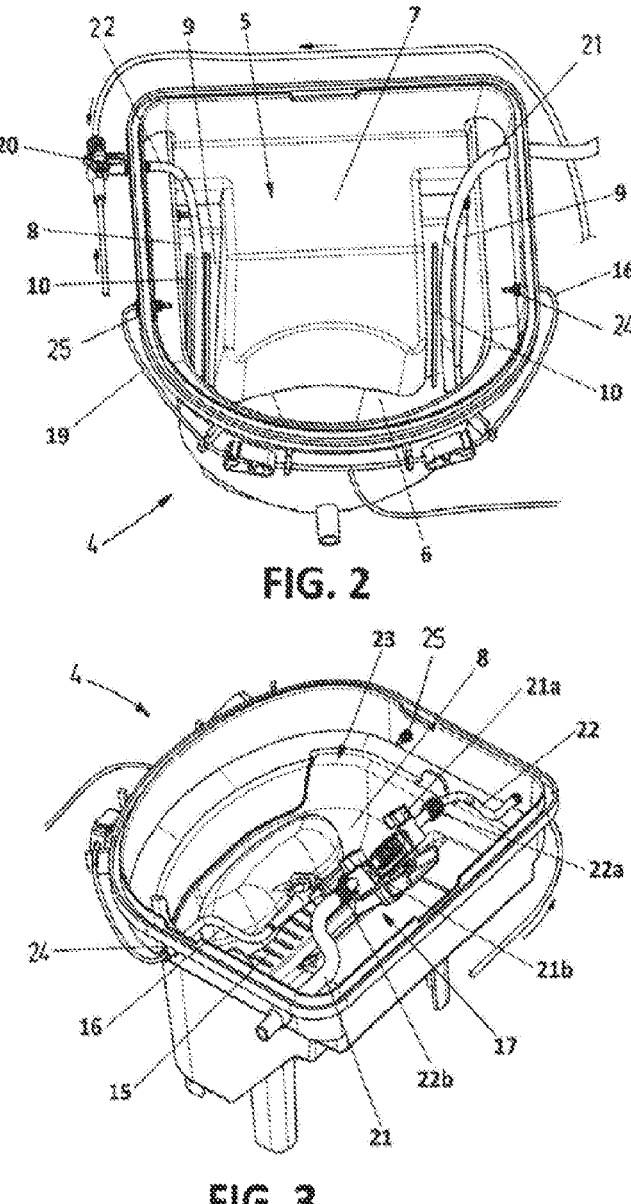
FIG. 2 shows a top view of a preferred embodiment of the renal container without the lid and without the removable tray, so that the central portion, the ramp and the holders for holding the tubes are clearly shown before starting the perfusion.
FIG. 3 shows a perspective view of a preferred embodiment of the container, wherein a kidney housed in the removable tray, the first tube and the second tube of the hydraulic circuit and the cannula to the ureter are shown.

FIG. 2 shows a top view of a preferred embodiment of the container (4) in a renal version, without the lid, wherein it is shown that said container (4) comprises an inner central portion (5) which in turn comprises a lower section (6) defining a cavity with respect to an upper section (7).

Likewise, FIG. 2 shows that, in a preferred embodiment, the container (4) in the central portion (5) comprises at least one ramp (9) located between the lower section (6) and the upper section (7), wherein said ramp (9) comprises holders (10) to hold at least one flow tube (21,22) before the kidney is housed.

In this way, when the device starts pumping the perfusion flow before introducing the kidney, the holders (10) on the ramp (9) provide a guide that maintains the first tube (21) and/or the second tube (22) oriented towards the lower portion (6) until the organ is introduced into the container, thus avoiding splashing and foaming in the container. Consequently, the perfusion process is cleaner.

FIG. 3 shows a perspective view of a preferred embodiment of the container (4), wherein it is shown that the device (1) comprises a removable tray (23) adapted to fit into the central portion (5) inside the container (4), wherein said removable tray (23) comprises a lower area (8) intended for the kidney, and is equipped with a plurality of openings (15).

Likewise, FIG. 3 further shows a hydraulic circuit (17) comprising a first tube (21) that channels a perfusion fluid externally pumped to the container (4) to the kidney, a second tube (22) that channels a vasodilator fluid to the kidney.

Additionally, FIG. 3 shows that the device comprises a ureteral cannula (16) that channels urine from the kidney to an external reservoir through a first outlet opening (24) in the container (4).

Figure 4:
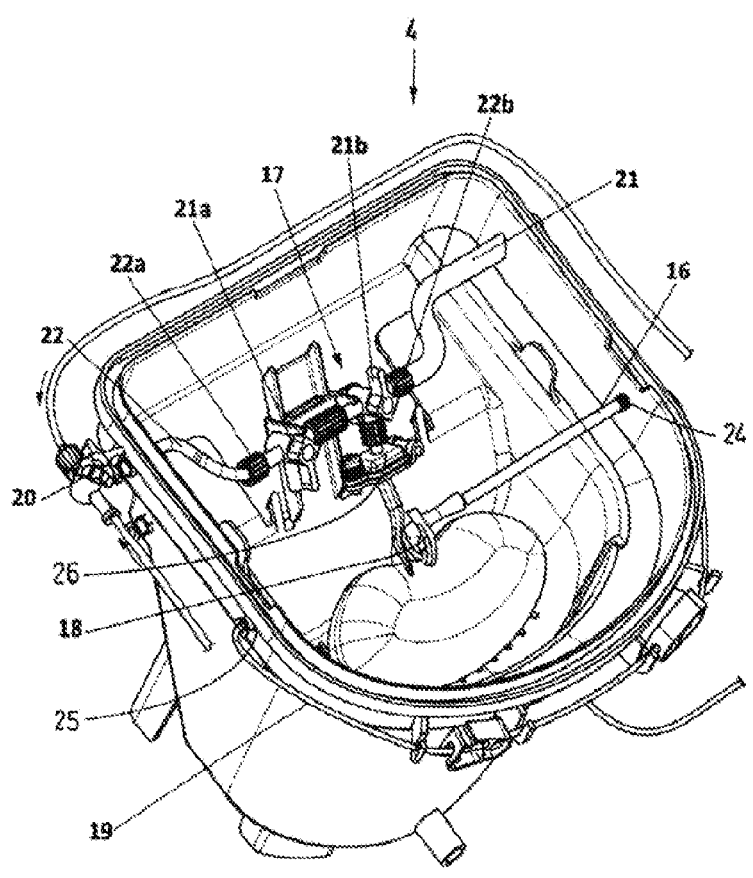
FIG. 4 shows a perspective plan view of the preferred embodiment of FIG. 3, wherein the cannula, the renal artery and the hydraulic circuit purge valves are shown.

Referring now to FIG. 4, a top view of the preferred embodiment described above is shown, wherein the renal artery (18), as well as a urine conveying tube (19) connected to a second opening (25) located on an opposite side with respect to the first outlet opening (24) are more clearly seen, so that the cannula (16) can channel urine from the kidney to the outside through both sides and openings (24, 25), thus enabling both right and left kidneys to be housed in a natural position. The conveyance of unused urine is blocked using "Roberts clamps" to prevent urine from returning to the container (4).

Furthermore, FIG. 4 further shows how in a preferred embodiment the second tube (22) is connected by means of a connection element (22*a*) close to the hepatic or renal artery, thus enabling the vasodilator to be introduced very close to the liver or kidney, respectively.

Additionally, in the preferred embodiment described above, as shown in FIG. 4, the hydraulic circuit (17) comprises two stopcocks (21*a*, 21*b*), one for the first tube (21) that channels the perfusion fluid, and another for the second tube (22) that channels a vasodilator, thus preventing air from entering the organ during perfusion.

Likewise, in a preferred embodiment, the hydraulic circuit (17) comprises a valve (20) located externally to the container (4) and operatively connected with an external washing tube that channels a washing fluid, so that the valve (20) is adapted to stop the inlet of vasodilator fluid and enable the inlet of the washing fluid, thus enabling the liver or kidney to be washed without the need to remove it from the container.

The invention claimed is:

1. A normothermic perfusion device to maintain in optimal physiological conditions a liver or kidney intended to be transplanted, wherein said device comprises a permanent part and a disposable part, wherein:
the permanent part comprises:
pumps,
heating elements, and
a controller, configured to regulate fluids in a hydraulic circuit and the temperature of said fluids, whether the container houses a liver or a kidney,
the disposable part comprises:
a container that in turn comprises:
the hydraulic circuit comprising one first tube that channels a perfusion fluid externally pumped to the container to the liver or kidney housed in a central portion inside the container, and a second tube that channels a vasodilator fluid, and
a cannula that channels urine or bile outward from the liver or kidney, respectively, to an external reservoir through a first outlet opening in the container,
wherein the central portion comprises a lower section which has a height difference with respect to an upper section and the liver or kidney is arranged between said upper section and the lower section, so that the perfusion fluid after circulating through the liver or kidney falls into the lower section, said lower section thus acting as a reservoir for perfusion fluid, and
connector which is connected combining the first tube and to the second tube right at the inlet of the artery of the liver or kidney, thus enabling the vasodilator fluid to be introduced directly into the artery.

2. The perfusion device of claim 1, wherein the lower section is equipped with a base with a smaller surface than the base of the upper section, thus preventing the perfusion fluid in contact with the air from deteriorating due to contact with the same.

3. The perfusion device of claim 1, wherein the container comprises a removable tray adapted to fit into the central portion, comprising a lower area intended to house the liver or kidney and equipped with a plurality of openings through which the perfusion liquid falls into the lower section.

4. The perfusion device of claim 1, wherein the container in the central portion comprises at least one ramp located between the lower section and the upper section, wherein said ramp comprises holders of the tubes, wherein the ramp and the holders are adapted to guide the tubes to the lower section until desired operating conditions are reached prior to connection of the liver or kidney.

5. The perfusion device of claim 1, wherein the container comprises a second outlet opening in the container located on an opposite side with respect to the first outlet opening, making it easier to position the cannula towards any of the openings, thus enabling both right and left kidneys to be housed in a natural position.

6. The perfusion device of claim 1, wherein the hydraulic circuit comprises, at least, one stopcock to purge said hydraulic circuit before starting a perfusion.

7. The perfusion device of claim 1, wherein the hydraulic circuit comprises a valve located externally to the container and operatively connected with an external washing tube that channels a washing fluid, so that the valve is adapted to stop an inlet of the vasodilator fluid and enable the inlet of the washing fluid, thus enabling the liver or kidney to be washed without the need to remove it from the container.

8. The perfusion device of claim 1, wherein the permanent part comprises a relief configured to house, at least, two containers of different dimensions and geometric configurations.

9. A method for perfusing a liver or kidney carried out in a normothermic perfusion device comprising a permanent part and a disposable part, wherein:
the permanent part comprises:
pumps,
heating elements, and
a controller, configured to regulate fluids in a hydraulic circuit and the temperature of said fluids, whether the container houses a liver or a kidney,
the disposable part comprises:
a container that in turn comprises:
the hydraulic circuit comprising one first tube that channels a perfusion fluid externally pumped to the container to the liver or kidney housed in a central portion inside the container, and a second tube that channels a vasodilator fluid, and
a cannula that channels urine or bile outward from the liver or kidney, respectively, to an external reservoir through a first outlet opening in the container,
wherein the central portion comprises a lower section which has a height difference with respect to an upper section and the liver or kidney is arranged between said upper section and the lower section, so that the perfusion fluid after circulating through the liver or kidney falls into the lower section, said lower section thus acting as a reservoir for perfusion fluid, and a connector is connected combining the first tube and the second tube right at the inlet of the artery of the liver or kidney, thus enabling the vasodilator fluid to be introduced directly into the artery; and wherein the method comprises the following steps:

placing the liver or kidney in the central portion of the container, the liver or kidney being arranged between the lower section and the upper section of said central portion;

fluidly connecting the perfusion fluid to the vascular inlets of the liver or kidney, in such a way that after circulating through the liver or kidney the perfusion fluid leaves the same and falls into the lower section of the container wherein it is stored, said lower section acting as a reservoir, and introducing a vasodilator fluid right at the inlet of the artery of the organ to be perfused.

10. The method of claim 9, further comprising a preliminary conditioning step which in turn comprises a step of:

guiding the first tube that channels the perfusion fluid to the lower section of the container prior to connecting the liver or the kidney until favourable operating conditions are reached.

11. The method of claim 10, further comprising a washing step which in turn comprises a step of:

stopping the inlet of the vasodilator fluid from the second tube, and introducing a colder washing fluid into said second tube, thus enabling the organ to be washed and damage to be prevented in the event of unexpected failure without removing it from the container.

\* \* \* \* \*